(12) United States Patent
Wiegman

(10) Patent No.: US 11,573,075 B1
(45) Date of Patent: Feb. 7, 2023

(54) SYSTEMS AND METHODS FOR ESTIMATING ANGULAR POSITION

(71) Applicant: BETA AIR, LLC, South Burlington, VT (US)

(72) Inventor: Herman Wiegman, Essex Junction, VT (US)

(73) Assignee: BETA AIR, LLC, South Burlington, VT (US)

( * ) Notice: Subject to any disclaimer, the term of this patent is extended or adjusted under 35 U.S.C. 154(b) by 0 days.

(21) Appl. No.: 17/477,012

(22) Filed: Sep. 16, 2021

(51) Int. Cl.
| | | |
|---|---|---|
| *G01B 7/30* | (2006.01) | |
| *G01D 5/14* | (2006.01) | |
| *H02P 21/18* | (2016.01) | |
| *H02P 101/30* | (2015.01) | |

(52) U.S. Cl.
CPC ............... *G01B 7/30* (2013.01); *G01D 5/145* (2013.01); *H02P 21/18* (2016.02); *H02P 2101/30* (2015.01)

(58) Field of Classification Search
CPC .. H02P 21/0014; H02P 21/18; H02P 2101/30; G01B 7/30; G01D 5/145
See application file for complete search history.

(56) References Cited

U.S. PATENT DOCUMENTS

| | | | |
|---|---|---|---|
| 5,241,267 A | | 8/1993 | Gleixner et al. |
| 7,021,587 B1 | | 4/2006 | Younkin et al. |
| 7,477,052 B2 | | 1/2009 | Schmidt et al. |
| 8,957,678 B2 | | 2/2015 | Oota et al. |
| 10,859,401 B2 | * | 12/2020 | Long ...................... G01D 5/145 |
| 11,208,200 B1 | * | 12/2021 | Auerbach ........... B64C 13/0421 |
| 2005/0152489 A1 | * | 7/2005 | Morita, Jr. ................ H02P 6/16 |
| | | | 377/6 |
| 2011/0057661 A1 | | 3/2011 | Samineni et al. |
| 2014/0028228 A1 | | 1/2014 | Huang et al. |
| 2014/0347040 A1 | | 11/2014 | Kawase et al. |
| 2015/0022186 A1 | | 1/2015 | Ausserlechner et al. |
| 2016/0373048 A1 | * | 12/2016 | Lee ........................ G01D 5/145 |
| 2017/0012559 A1 | * | 1/2017 | Rethinam ................. H02P 6/14 |
| 2017/0093313 A1 | | 3/2017 | Brown et al. |
| 2020/0114967 A1 | * | 4/2020 | Nakajima .............. B62D 5/049 |

FOREIGN PATENT DOCUMENTS

| | | | | |
|---|---|---|---|---|
| CN | 104579029 A | * | 4/2015 | ............... H02P 6/00 |
| EP | 2093538 | | 8/2009 | |
| EP | 2093538 A1 | * | 8/2009 | ............ G01B 21/22 |
| FR | 2902872 | | 12/2007 | |
| WO | 03087845 | | 10/2003 | |
| WO | 2014037273 | | 3/2014 | |

* cited by examiner

*Primary Examiner* — Bickey Dhakal
(74) *Attorney, Agent, or Firm* — Caldwell Intellectual Property Law

(57) ABSTRACT

A system for estimating the angular position of a rotating shaft in an aircraft, the system including at least three electromagnetic effect sensors. The system including a flight controller that runs a voting algorithm, wherein the voting algorithm computes an output datum based on shaft position datum that qualify as both active and admissible. Furthermore, system may include, as a component of the voting algorithm, a banning process where sensors that repeatedly return datum that are either not active or not admissible can be banned.

16 Claims, 10 Drawing Sheets

SYSTEMS AND METHODS FOR ESTIMATING ANGULAR POSITION

FIELD OF THE INVENTION

The present invention generally relates to the field of flight controls. In particular, the present invention is directed to systems and methods for estimating angular position of a rotating shaft within an aircraft.

BACKGROUND

In electrically propelled vehicles, it is important to maintain the integrity of the aircraft until landing. It is important, therefore, for the flight controller to receive accurate and representative data from all of the sensors in the aircraft. Existing solutions for reliably sensing the current states of flight components do not resolve this issue in a satisfactory manner.

SUMMARY OF THE DISCLOSURE

In an aspect, a system for estimating angular position, the system including a set of electromagnetic effect sensors comprising: a first electromagnetic effect sensor, the first electromagnetic effect sensor configured to output a first shaft position datum; a second electromagnetic effect sensor, the second electromagnetic effect sensor configured to output a second shaft position datum; and a third electromagnetic effect sensor, the third electromagnetic effect sensor configured to output a third shaft position datum. The system further including a flight controller, the flight controller communicatively connected to the set of electromagnetic effect sensors, the flight controller configured to perform a voting algorithm, the voting algorithm comprising: determining that at least one of the set of electromagnetic effect sensors is an allowed sensor, wherein determining that at least one of the set of electromagnetic effect sensors is an allowed sensor comprises determining, for each shaft position datum of the first shaft position datum and the second shaft position datum: whether the shaft position datum is an active datum; and whether the shaft position datum is an admissible datum; and generating, as a function of a shaft position datum from an allowed sensor, an output datum.

In another aspect, a method for estimating angular position includes receiving data from a set of electromagnetic effect sensors, the set of electromagnetic effect sensors comprising a first electromagnetic effect sensor configured to output a first shaft position datum and a second electromagnetic effect sensor configured to output a second shaft position datum, determining that at least one of a set of electromagnetic effect sensors is an allowed sensor, wherein determining that at least one of the set of electromagnetic effect sensors is an allowed sensor comprises, for each shaft position datum of the first shaft position datum and the second shaft position datum determining whether the shaft position datum is an active datum and determining whether the shaft position datum is an admissible datum, and generating, as a function of a shaft position datum from an allowed sensor, an output datum.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for an electromagnetic sensor system for use in an electric aircraft that monitors angular rotation. A system includes a set of electromagnetic effect sensors and a flight controller. The flight controller can include a voting algorithm that takes into account datum that are active and admissible and bans sensors that repeatedly provide datum that are either not active or not admissible.

Aspects of the present disclosure can be used to reinforce the accuracy of certain electromagnetic sensors on an electric aircraft. Particularly, any electromagnetic sensor that is used to monitor the rotation of a shaft such as those found in flight components, including, for example flaps, rudders, and ailerons.

Figure 1:
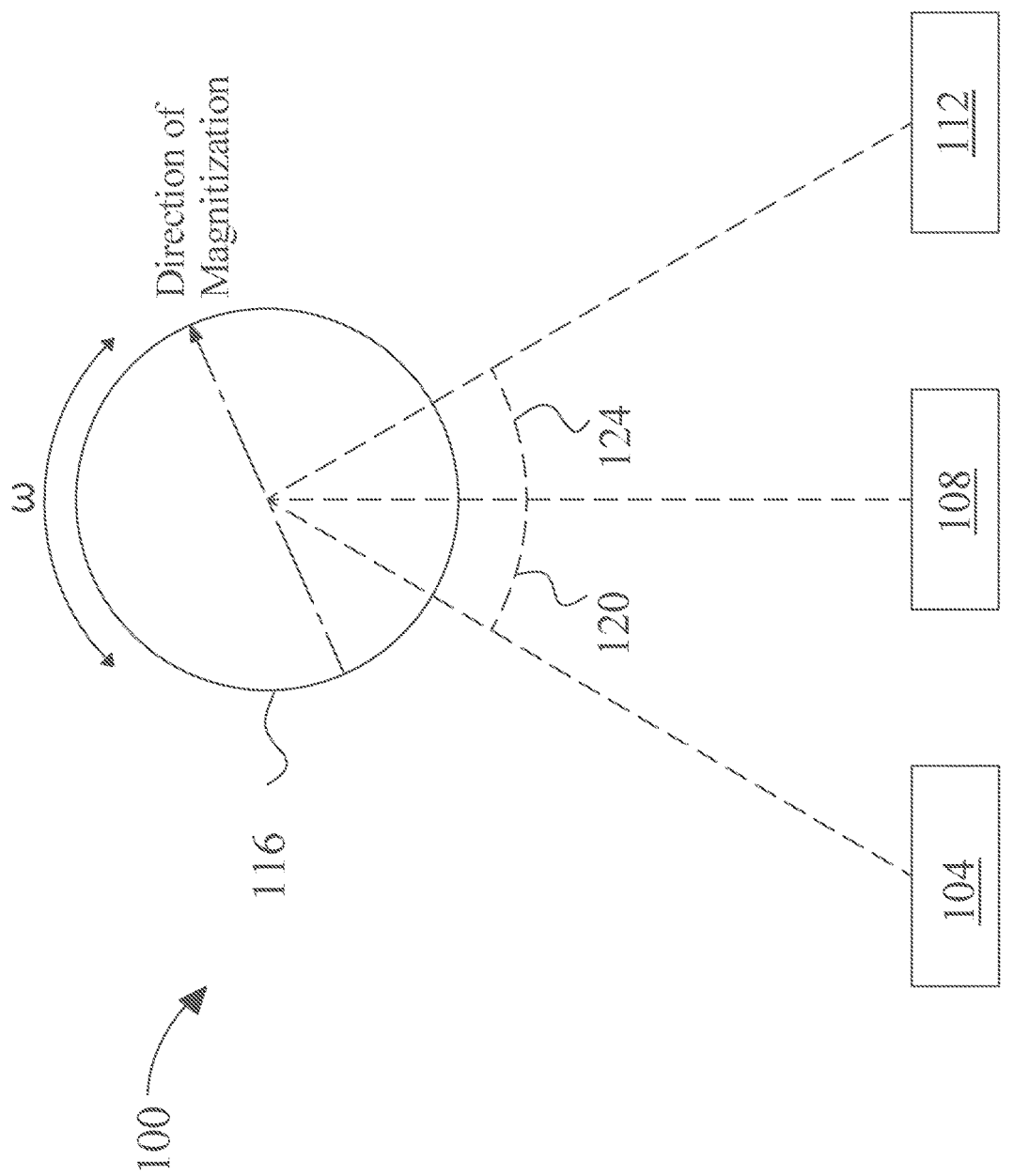
FIG. 1 is a diagram of three electromagnetic effect sensors oriented around a spinning magnet.

Referring now to FIG. 1, an exemplary embodiment of a measurement system 100 for estimating angular position is illustrated. Measurement system 100 includes a first electromagnetic effect sensor 104, second electromagnetic effect sensor 108, and third electromagnetic effect sensor 112. First electromagnetic effect sensor 104 may include any sensor or collection of sensors that makes its readings based on an electromagnetic effect. Electromagnetic effect, for the purposes of this disclosure, can be any effect caused by an electromagnetic field. Electromagnetic fields are caused by the flow of electric current. For example, and without limitation, one electromagnetic effect could be the Lorentz force. As another non-limiting example, another electromagnetic effect could be the electromotive force (emf). For example, first electromagnetic effect sensor 104 could be a hall effect sensor. The first electromagnetic effect sensor 104 is configured to output a first shaft position datum. For the purposes of this disclosure, first shaft position datum measures an angular position of a given shaft. For example, this could include the rotation of a shaft about its axis when driven by a servo motor. As a non-limiting example, the shaft may be attached to a flight component such that the flight component can be rotated about the shaft using an actuator. A flight component may include, without limitation, any aerodynamic surface attached to an aircraft that interacts with forces to move the aircraft, such as without limitation ailerons, flaps, leading edge flaps, rudders, elevators, spoilers, slats, blades, stabilizers, airfoils, a combination thereof, or any other moveable surface used to control an aircraft in a fluid medium. In some embodiments, this may be implemented as disclosed in U.S. Pat. No. 9,663,221, filed on Dec. 13, 2013, and entitled "Actuator Device for Flight Control Surface of Aircraft, and Aircraft," the entirety of which is incorporated herein by reference. Also, in some embodiments, the shaft could be part of a pilot control system such as, for example, a control column, thumb wheel, or inceptor stick, among others. In some embodiments, this may be implemented as disclosed in U.S. application Ser. No. 16/929,206 filed on Jul. 15, 2020, entitled "Hover and Thrust Control Assembly for Dual-Mode Aircraft," the entirety of which is incorporated herein by reference, alternatively it may be implemented as disclosed in U.S. application Ser. No. 17/001,845 filed on Aug. 25, 2020, entitled "A Hover and Thrust Control Assembly for Dual-Mode Aircraft," the entirety of which is incorporated herein by reference.

Still referring to FIG. 1, for the purposes of this disclosure, second electromagnetic effect sensor 108 may include any sensor suitable for use as first sensor, including without limitation any sensor that makes its readings based on an electromagnetic effect. For example, second electromagnetic effect sensor 108 could be a hall effect sensor. The second electronic effect sensor is configured to output a second shaft position datum. For the purposes of this disclosure, second shaft position datum measures the angular position of a given shaft. Any of the examples of shafts discussed above pertaining to the first shaft position datum also could apply to the second shaft position datum.

Continuing with FIG. 1, for the purposes of this disclosure, third electromagnetic effect sensor 112 may be any sensor that makes its readings based on the electromagnetic effect. For example, third electromagnetic effect sensor 112 could be a hall effect sensor. The third electronic effect sensor is configured to output a third shaft position datum. For the purposes of this disclosure, third shaft position datum measures the angular position of a given shaft. Any of the examples of shafts discussed above pertaining to the first shaft position datum also could apply to the second shaft position datum.

Continuing with FIG. 1, measurement system 100 contains a magnet 116. Magnet 116 spins at a rate of ω. The axis of rotation goes through the center of magnet 116 and is normal to the page. First electromagnetic effect sensor 104, second electromagnetic effect sensor 108, and third electromagnetic effect sensor 112 are mounted in a plane that is parallel to magnet 116's axis of rotation.

Continuing with FIG. 1, first electromagnetic effect sensor 104, second electromagnetic effect sensor 108, and third electromagnetic effect sensor 112 are spaced apart such that they form a first angle 120 and a second angle 124 with the axis of rotation of magnet 116. In a non-limiting embodiment, first angle 120 is equal to $\pi/6$ and second angle 124 is equal to $\pi/6$.

Continuing with FIG. 1, in some embodiments, first electromagnetic effect sensor 104 may comprise at least three sensor elements. Sensor elements may comprise a collection of sensors that make readings based on the electromagnetic effect. The sensor element generates a measured value. For the purposes of this disclosure, measured values can include the property that is directly measured by first electromagnetic effect sensor 104. For example, in the case where first electromagnetic effect sensor 104 is a hall sensor, the measured value would be a voltage. Additionally, measured values can also include a value that is the result of processing on first electromagnetic effect sensor 104, such as, for example, angular rotation.

Continuing with FIG. 1, in some embodiments, second electromagnetic effect sensor 108 may comprise at least three sensor elements. Sensor elements may comprise a collection of sensors that make readings based on the electromagnetic effect. The sensor element generates a measured value. For the purposes of this disclosure, measured values can include the property that is directly measured by first electromagnetic effect sensor 104. For example, in the case where first electromagnetic effect sensor 104 is a hall sensor, the measured value would be a voltage. Additionally, measured values can also include a value that is the result of processing on first electromagnetic effect sensor 104, such as, for example, angular rotation.

Continuing with FIG. 1, in some embodiments, third electromagnetic effect sensor 112 may comprise at least three sensor elements. Sensor elements may comprise a collection of sensors that make readings based on the electromagnetic effect. The sensor element generates a measured value. For the purposes of this disclosure, measured values can include the property that is directly measured by first electromagnetic effect sensor 104. For example, in the case where first electromagnetic effect sensor 104 is a hall sensor, the measured value would be a voltage. Additionally, measured values can also include a value that is the result of processing on first electromagnetic effect sensor 104, such as, for example, angular rotation.

Moving to FIG. 2, data system 200 includes a flight controller 204; flight controller may be implemented in any manner described below. Flight controller 204 is communicatively connected to the first electromagnetic effect sensor 104, second electromagnetic effect sensor 108, and third electromagnetic effect sensor 112. Flight controller 204 receives a shaft position datum 208 from an electromagnetic effect sensor 212. Shaft position datum 208 may include any of the first shaft position datum, second shaft position datum, or third shaft position datum. Electromagnetic effect sensor 212 can be any of the first electromagnetic effect sensor 104, second electromagnetic effect sensor, or third electromagnetic effect sensor. Additionally, flight controller 204 may receive multiple shaft position datum 208 associated with multiple electromagnetic effect sensors 212. Flight controller 204 is configured to perform a voting algorithm 216.

Figure 3:
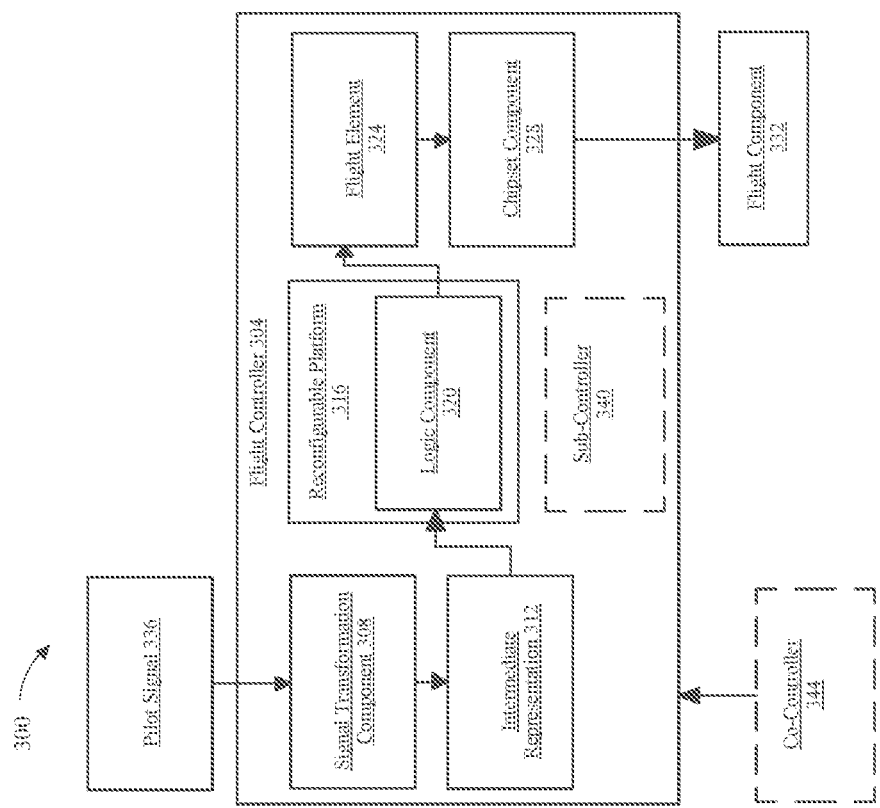
FIG. 3 is a block diagram of an exemplary flight controller.

Now referring to FIG. 3, an exemplary embodiment 300 of a flight controller 304 is illustrated. As used in this disclosure a "flight controller" is a computing device of a plurality of computing devices dedicated to data storage, security, distribution of traffic for load balancing, and flight instruction. Flight controller 304 may include and/or communicate with any computing device as described in this disclosure, including without limitation a microcontroller, microprocessor, digital signal processor (DSP) and/or system on a chip (SoC) as described in this disclosure. Further, flight controller 304 may include a single computing device operating independently, or may include two or more computing device operating in concert, in parallel, sequentially or the like; two or more computing devices may be included together in a single computing device or in two or more computing devices. In embodiments, flight controller 304 may be installed in an aircraft, may control the aircraft remotely, and/or may include an element installed in the aircraft and a remote element in communication therewith.

In an embodiment, and still referring to FIG. 3, flight controller 304 may include a signal transformation component 308. As used in this disclosure a "signal transformation component" is a component that transforms and/or converts a first signal to a second signal, wherein a signal may include one or more digital and/or analog signals. For example, and without limitation, signal transformation component 308 may be configured to perform one or more operations such as preprocessing, lexical analysis, parsing, semantic analysis, and the like thereof. In an embodiment, and without limitation, signal transformation component 308 may include one or more analog-to-digital convertors that transform a first signal of an analog signal to a second signal of a digital signal. For example, and without limitation, an analog-to-digital converter may convert an analog input signal to a 10-bit binary digital representation of that signal. In another embodiment, signal transformation component 308 may include transforming one or more low-level languages such as, but not limited to, machine languages and/or assembly languages. For example, and without limitation, signal transformation component 308 may include transforming a binary language signal to an assembly language signal. In an embodiment, and without limitation, signal transformation component 308 may include transforming one or more high-level languages and/or formal languages such as but not limited to alphabets, strings, and/or languages. For example, and without limitation, high-level languages may include one or more system languages, scripting languages, domain-specific languages, visual languages, esoteric languages, and the like thereof. As a further non-limiting example, high-level languages may include one or more algebraic formula languages, business data languages, string and list languages, object-oriented languages, and the like thereof.

Still referring to FIG. 3, signal transformation component 308 may be configured to optimize an intermediate representation 312. As used in this disclosure an "intermediate representation" is a data structure and/or code that represents the input signal. Signal transformation component 308 may optimize intermediate representation as a function of a data-flow analysis, dependence analysis, alias analysis, pointer analysis, escape analysis, and the like thereof. In an embodiment, and without limitation, signal transformation component 308 may optimize intermediate representation 312 as a function of one or more inline expansions, dead code eliminations, constant propagation, loop transformations, and/or automatic parallelization functions. In another embodiment, signal transformation component 308 may optimize intermediate representation as a function of a machine dependent optimization such as a peephole optimization, wherein a peephole optimization may rewrite short sequences of code into more efficient sequences of code. Signal transformation component 308 may optimize intermediate representation to generate an output language, wherein an "output language," as used herein, is the native machine language of flight controller 304. For example, and without limitation, native machine language may include one or more binary and/or numerical languages.

In an embodiment, and without limitation, signal transformation component 308 may include transform one or more inputs and outputs as a function of an error correction code. An error correction code, also known as error correcting code (ECC), is an encoding of a message or lot of data using redundant information, permitting recovery of corrupted data. An ECC may include a block code, in which information is encoded on fixed-size packets and/or blocks of data elements such as symbols of predetermined size, bits, or the like. Reed-Solomon coding, in which message symbols within a symbol set having q symbols are encoded as coefficients of a polynomial of degree less than or equal to a natural number k, over a finite field F with q elements; strings so encoded have a minimum hamming distance of k+1, and permit correction of (q−k−1)/2 erroneous symbols. Block code may alternatively or additionally be implemented using Golay coding, also known as binary Golay coding, Bose-Chaudhuri, Hocquenghuem (BCH) coding, multidimensional parity-check coding, and/or Hamming codes. An ECC may alternatively or additionally be based on a convolutional code.

In an embodiment, and still referring to FIG. 3, flight controller 304 may include a reconfigurable hardware platform 316. A "reconfigurable hardware platform," as used herein, is a component and/or unit of hardware that may be reprogrammed, such that, for instance, a data path between elements such as logic gates or other digital circuit elements may be modified to change an algorithm, state, logical sequence, or the like of the component and/or unit. This may be accomplished with such flexible high-speed computing fabrics as field-programmable gate arrays (FPGAs), which may include a grid of interconnected logic gates, connections between which may be severed and/or restored to program in modified logic. Reconfigurable hardware platform 316 may be reconfigured to enact any algorithm and/or algorithm selection process received from another computing device and/or created using machine-learning processes.

Still referring to FIG. 3, reconfigurable hardware platform 316 may include a logic component 320. As used in this disclosure a "logic component" is a component that executes instructions on output language. For example, and without limitation, logic component may perform basic arithmetic, logic, controlling, input/output operations, and the like thereof. Logic component 320 may include any suitable processor, such as without limitation a component incorporating logical circuitry for performing arithmetic and logical operations, such as an arithmetic and logic unit (ALU), which may be regulated with a state machine and directed by operational inputs from memory and/or sensors; logic component 320 may be organized according to Von Neumann and/or Harvard architecture as a non-limiting example. Logic component 320 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC). In an embodiment, logic component 320 may include one or more integrated circuit microprocessors, which may contain one or more central processing units, central processors, and/or main processors, on a single metal-oxide-semiconductor chip. Logic component 320 may be configured to execute a sequence of stored instructions to be performed on the output language and/or intermediate representation 312. Logic component 320 may be configured to fetch and/or retrieve the instruction from a memory cache, wherein a "memory cache," as used in this disclosure, is a stored instruction set on flight controller 304. Logic component 320 may be configured to decode the instruction retrieved from the memory cache to opcodes and/or operands. Logic component 320 may be configured to execute the instruction on intermediate representation 312 and/or output language. For example, and without limitation, logic component 320 may be configured to execute an addition operation on intermediate representation 312 and/or output language.

In an embodiment, and without limitation, logic component 320 may be configured to calculate a flight element 324. As used in this disclosure a "flight element" is an element of datum denoting a relative status of aircraft. For example, and without limitation, flight element 324 may denote one or more torques, thrusts, airspeed velocities, forces, altitudes, groundspeed velocities, directions during flight, directions facing, forces, orientations, and the like thereof. For example, and without limitation, flight element 324 may denote that aircraft is cruising at an altitude and/or with a sufficient magnitude of forward thrust. As a further non-limiting example, flight status may denote that is building thrust and/or groundspeed velocity in preparation for a takeoff. As a further non-limiting example, flight element 324 may denote that aircraft is following a flight path accurately and/or sufficiently.

Still referring to FIG. 3, flight controller 304 may include a chipset component 328. As used in this disclosure a "chipset component" is a component that manages data flow. In an embodiment, and without limitation, chipset component 328 may include a northbridge data flow path, wherein the northbridge dataflow path may manage data flow from logic component 320 to a high-speed device and/or component, such as a RAM, graphics controller, and the like thereof. In another embodiment, and without limitation, chipset component 328 may include a southbridge data flow path, wherein the southbridge dataflow path may manage data flow from logic component 320 to lower-speed peripheral buses, such as a peripheral component interconnect (PCI), industry standard architecture (ICA), and the like thereof. In an embodiment, and without limitation, southbridge data flow path may include managing data flow between peripheral connections such as ethernet, USB, audio devices, and the like thereof. Additionally, or alternatively, chipset component 328 may manage data flow between logic component 320, memory cache, and a flight component 332. As used in this disclosure a "flight component" is a portion of an aircraft that can be moved or adjusted to affect one or more flight elements. For example, flight component 332 may include a component used to affect the aircrafts' roll and pitch which may comprise one or more ailerons. As a further example, flight component 332 may include a rudder to control yaw of an aircraft. In an embodiment, chipset component 328 may be configured to communicate with a plurality of flight components as a function of flight element 324. For example, and without limitation, chipset component 328 may transmit to an aircraft rotor to reduce torque of a first lift propulsor and increase the forward thrust produced by a pusher component to perform a flight maneuver.

In an embodiment, and still referring to FIG. 3, flight controller 304 may be configured generate an autonomous function. As used in this disclosure an "autonomous function" is a mode and/or function of flight controller 304 that controls aircraft automatically. For example, and without limitation, autonomous function may perform one or more aircraft maneuvers, take offs, landings, altitude adjustments, flight leveling adjustments, turns, climbs, and/or descents. As a further non-limiting example, autonomous function may adjust one or more airspeed velocities, thrusts, torques, and/or groundspeed velocities. As a further non-limiting example, autonomous function may perform one or more flight path corrections and/or flight path modifications as a function of flight element 324. In an embodiment, autonomous function may include one or more modes of autonomy such as, but not limited to, autonomous mode, semi-autonomous mode, and/or non-autonomous mode. As used in this disclosure "autonomous mode" is a mode that automatically adjusts and/or controls aircraft and/or the maneuvers of aircraft in its entirety. For example, autonomous mode may denote that flight controller 304 will adjust the aircraft. As used in this disclosure a "semi-autonomous mode" is a mode that automatically adjusts and/or controls a portion and/or section of aircraft. For example, and without limitation, semi-autonomous mode may denote that a pilot will control the propulsors, wherein flight controller 304 will control the ailerons and/or rudders. As used in this disclosure "non-autonomous mode" is a mode that denotes a pilot will control aircraft and/or maneuvers of aircraft in its entirety.

In an embodiment, and still referring to FIG. 3, flight controller 304 may generate autonomous function as a function of an autonomous machine-learning model. As used in this disclosure an "autonomous machine-learning model" is a machine-learning model to produce an autonomous function output given flight element 324 and a pilot signal 336 as inputs; this is in contrast to a non-machine learning software program where the commands to be executed are determined in advance by a user and written in a programming language. As used in this disclosure a "pilot signal" is an element of datum representing one or more functions a pilot is controlling and/or adjusting. For example, pilot signal 336 may denote that a pilot is controlling and/or maneuvering ailerons, wherein the pilot is not in control of the rudders and/or propulsors. In an embodiment, pilot signal 336 may include an implicit signal and/or an explicit signal. For example, and without limitation, pilot signal 336 may include an explicit signal, wherein the pilot explicitly states there is a lack of control and/or desire for autonomous function. As a further non-limiting example, pilot signal 336 may include an explicit signal directing flight controller 304 to control and/or maintain a portion of aircraft, a portion of the flight plan, the entire aircraft, and/or the entire flight plan. As a further non-limiting example, pilot signal 336 may include an implicit signal, wherein flight controller 304 detects a lack of control such as by a malfunction, torque alteration, flight path deviation, and the like thereof. In an embodiment, and without limitation, pilot signal 336 may include one or more explicit signals to reduce torque, and/or one or more implicit signals that torque may be reduced due to reduction of airspeed velocity. In an embodiment, and without limitation, pilot signal 336 may include one or more local and/or global signals. For example, and without limitation, pilot signal 336 may include a local signal that is transmitted by a pilot and/or crew member. As a further non-limiting example, pilot signal 336 may include a global signal that is transmitted by air traffic control and/or one or more remote users that are in communication with the pilot of aircraft. In an embodiment, pilot signal 336 may be received as a function of a tri-state bus and/or multiplexor that denotes an explicit pilot signal should be transmitted prior to any implicit or global pilot signal.

Still referring to FIG. 3, autonomous machine-learning model may include one or more autonomous machine-learning processes such as supervised, unsupervised, or reinforcement machine-learning processes that flight controller 304 and/or a remote device may or may not use in the generation of autonomous function. As used in this disclosure "remote device" is an external device to flight controller 304. Additionally, or alternatively, autonomous machine-learning model may include one or more autonomous machine-learning processes that a field-programmable gate array (FPGA) may or may not use in the generation of autonomous function. Autonomous machine-learning process may include, without limitation machine learning processes such as simple linear regression, multiple linear regression, polynomial regression, support vector regression, ridge regression, lasso regression, elasticnet regression, decision tree regression, random forest regression, logistic regression, logistic classification, K-nearest neighbors, support vector machines, kernel support vector machines, naïve bayes, decision tree classification, random forest classification, K-means clustering, hierarchical clustering, dimensionality reduction, principal component analysis, linear discriminant analysis, kernel principal component analysis, Q-learning, State Action Reward State Action (SARSA), Deep-Q network, Markov decision processes, Deep Deterministic Policy Gradient (DDPG), or the like thereof.

In an embodiment, and still referring to FIG. 3, autonomous machine learning model may be trained as a function of autonomous training data, wherein autonomous training data may correlate a flight element, pilot signal, and/or simulation data to an autonomous function. For example, and without limitation, a flight element of an airspeed velocity, a pilot signal of limited and/or no control of propulsors, and a simulation data of required airspeed velocity to reach the destination may result in an autonomous function that includes a semi-autonomous mode to increase thrust of the propulsors. Autonomous training data may be received as a function of user-entered valuations of flight elements, pilot signals, simulation data, and/or autonomous functions. Flight controller 304 may receive autonomous training data by receiving correlations of flight element, pilot signal, and/or simulation data to an autonomous function that were previously received and/or determined during a previous iteration of generation of autonomous function. Autonomous training data may be received by one or more remote devices and/or FPGAs that at least correlate a flight element, pilot signal, and/or simulation data to an autonomous function. Autonomous training data may be received in the form of one or more user-entered correlations of a flight element, pilot signal, and/or simulation data to an autonomous function.

Still referring to FIG. 3, flight controller 304 may receive autonomous machine-learning model from a remote device and/or FPGA that utilizes one or more autonomous machine learning processes, wherein a remote device and an FPGA is described above in detail. For example, and without limitation, a remote device may include a computing device, external device, processor, FPGA, microprocessor and the like thereof. Remote device and/or FPGA may perform the autonomous machine-learning process using autonomous training data to generate autonomous function and transmit the output to flight controller 304. Remote device and/or FPGA may transmit a signal, bit, datum, or parameter to flight controller 304 that at least relates to autonomous function. Additionally, or alternatively, the remote device and/or FPGA may provide an updated machine-learning model. For example, and without limitation, an updated machine-learning model may be comprised of a firmware update, a software update, an autonomous machine-learning process correction, and the like thereof. As a non-limiting example, a software update may incorporate a new simulation data that relates to a modified flight element. Additionally, or alternatively, the updated machine learning model may be transmitted to the remote device and/or FPGA, wherein the remote device and/or FPGA may replace the autonomous machine-learning model with the updated machine-learning model and generate the autonomous function as a function of the flight element, pilot signal, and/or simulation data using the updated machine-learning model. The updated machine-learning model may be transmitted by the remote device and/or FPGA and received by flight controller 304 as a software update, firmware update, or corrected autonomous machine-learning model. For example, and without limitation autonomous machine learning model may utilize a neural net machine-learning process, wherein the updated machine-learning model may incorporate a gradient boosting machine-learning process.

Still referring to FIG. 3, flight controller 304 may include, be included in, and/or communicate with a mobile device such as a mobile telephone or smartphone. Further, flight controller may communicate with one or more additional devices as described below in further detail via a network interface device. The network interface device may be utilized for commutatively connecting a flight controller to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. The network may include any network topology and can may employ a wired and/or a wireless mode of communication.

In an embodiment, and still referring to FIG. 3, flight controller 304 may include, but is not limited to, for example, a cluster of flight controllers in a first location and a second flight controller or cluster of flight controllers in a second location. Flight controller 304 may include one or more flight controllers dedicated to data storage, security, distribution of traffic for load balancing, and the like. Flight controller 304 may be configured to distribute one or more computing tasks as described below across a plurality of flight controllers, which may operate in parallel, in series, redundantly, or in any other manner used for distribution of tasks or memory between computing devices. For example, and without limitation, flight controller 304 may implement a control algorithm to distribute and/or command the plurality of flight controllers. As used in this disclosure a "control algorithm" is a finite sequence of well-defined computer implementable instructions that may determine the flight component of the plurality of flight components to be adjusted. For example, and without limitation, control algorithm may include one or more algorithms that reduce and/or prevent aviation asymmetry. As a further non-limiting example, control algorithms may include one or more models generated as a function of a software including, but not limited to Simulink by MathWorks, Natick, Mass., USA. In an embodiment, and without limitation, control algorithm may be configured to generate an auto-code, wherein an "auto-code," is used herein, is a code and/or algorithm that is generated as a function of the one or more models and/or software's. In another embodiment, control algorithm may be configured to produce a segmented control algorithm. As used in this disclosure a "segmented control algorithm" is control algorithm that has been separated and/or parsed into discrete sections. For example, and without limitation, segmented control algorithm may parse control algorithm into two or more segments, wherein each segment of control algorithm may be performed by one or more flight controllers operating on distinct flight components.

In an embodiment, and still referring to FIG. 3, control algorithm may be configured to determine a segmentation boundary as a function of segmented control algorithm. As used in this disclosure a "segmentation boundary" is a limit and/or delineation associated with the segments of the segmented control algorithm. For example, and without limitation, segmentation boundary may denote that a segment in the control algorithm has a first starting section and/or a first ending section. As a further non-limiting example, segmentation boundary may include one or more boundaries associated with an ability of flight component 332. In an embodiment, control algorithm may be configured to create an optimized signal communication as a function of segmentation boundary. For example, and without limitation, optimized signal communication may include identifying the discrete timing required to transmit and/or receive the one or more segmentation boundaries. In an embodiment, and without limitation, creating optimized signal communication further comprises separating a plurality of signal codes across the plurality of flight controllers. For example, and without limitation the plurality of flight controllers may include one or more formal networks, wherein formal networks transmit data along an authority chain and/or are limited to task-related communications. As a further non-limiting example, communication network may include informal networks, wherein informal networks transmit data in any direction. In an embodiment, and without limitation, the plurality of flight controllers may include a chain path, wherein a "chain path," as used herein, is a linear communication path comprising a hierarchy that data may flow through. In an embodiment, and without limitation, the plurality of flight controllers may include an all-channel path, wherein an "all-channel path," as used herein, is a communication path that is not restricted to a particular direction. For example, and without limitation, data may be transmitted upward, downward, laterally, and the like thereof. In an embodiment, and without limitation, the plurality of flight controllers may include one or more neural networks that assign a weighted value to a transmitted datum. For example, and without limitation, a weighted value may be assigned as a function of one or more signals denoting that a flight component is malfunctioning and/or in a failure state.

Still referring to FIG. 3, the plurality of flight controllers may include a master bus controller. As used in this disclosure a "master bus controller" is one or more devices and/or components that are connected to a bus to initiate a direct memory access transaction, wherein a bus is one or more terminals in a bus architecture. Master bus controller may communicate using synchronous and/or asynchronous bus control protocols. In an embodiment, master bus controller may include flight controller 304. In another embodiment, master bus controller may include one or more universal asynchronous receiver-transmitters (UART). For example, and without limitation, master bus controller may include one or more bus architectures that allow a bus to initiate a direct memory access transaction from one or more buses in the bus architectures. As a further non-limiting example, master bus controller may include one or more peripheral devices and/or components to communicate with another peripheral device and/or component and/or the master bus controller. In an embodiment, master bus controller may be configured to perform bus arbitration. As used in this disclosure "bus arbitration" is method and/or scheme to prevent multiple buses from attempting to communicate with and/or connect to master bus controller. For example and without limitation, bus arbitration may include one or more schemes such as a small computer interface system, wherein a small computer interface system is a set of standards for physical connecting and transferring data between peripheral devices and master bus controller by defining commands, protocols, electrical, optical, and/or logical interfaces. In an embodiment, master bus controller may receive intermediate representation 312 and/or output language from logic component 320, wherein output language may include one or more analog-to-digital conversions, low bit rate transmissions, message encryptions, digital signals, binary signals, logic signals, analog signals, and the like thereof described above in detail.

Still referring to FIG. 3, master bus controller may communicate with a slave bus. As used in this disclosure a "slave bus" is one or more peripheral devices and/or components that initiate a bus transfer. For example, and without limitation, slave bus may receive one or more controls and/or asymmetric communications from master bus controller, wherein slave bus transfers data stored to master bus controller. In an embodiment, and without limitation, slave bus may include one or more internal buses, such as but not limited to a/an internal data bus, memory bus, system bus, front-side bus, and the like thereof. In another embodiment, and without limitation, slave bus may include one or more external buses such as external flight controllers, external computers, remote devices, printers, aircraft computer systems, flight control systems, and the like thereof.

In an embodiment, and still referring to FIG. 3, control algorithm may optimize signal communication as a function of determining one or more discrete timings. For example, and without limitation master bus controller may synchronize timing of the segmented control algorithm by injecting high priority timing signals on a bus of the master bus control. As used in this disclosure a "high priority timing signal" is information denoting that the information is important. For example, and without limitation, high priority timing signal may denote that a section of control algorithm is of high priority and should be analyzed and/or transmitted prior to any other sections being analyzed and/or transmitted. In an embodiment, high priority timing signal may include one or more priority packets. As used in this disclosure a "priority packet" is a formatted unit of data that is communicated between the plurality of flight controllers. For example, and without limitation, priority packet may denote that a section of control algorithm should be used and/or is of greater priority than other sections.

Still referring to FIG. 3, flight controller 304 may also be implemented using a "shared nothing" architecture in which data is cached at the worker, in an embodiment, this may enable scalability of aircraft and/or computing device. Flight controller 304 may include a distributed flight controller. As used in this disclosure a "distribute flight controller" is a component that adjusts and/or controls a plurality of flight components as a function of a plurality of flight controllers. For example, distributed flight controller may include a flight controller that communicates with a plurality of additional flight controllers and/or clusters of flight controllers. In an embodiment, distributed flight control may include one or more neural networks. For example, neural network also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 3, a node may include, without limitation a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally, or alternatively, a bias b may be added to the weighted sum of the inputs such that an offset is added to each unit in the neural network layer that is independent of the input to the layer. The weighted sum may then be input into a function $\phi$, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above. In an embodiment, and without limitation, a neural network may receive semantic units as inputs and output vectors representing such semantic units according to weights $w_i$ that are derived using machine-learning processes as described in this disclosure.

Still referring to FIG. 3, flight controller may include a sub-controller 340. As used in this disclosure a "sub-controller" is a controller and/or component that is part of a distributed controller as described above; for instance, flight controller 304 may be and/or include a distributed flight controller made up of one or more sub-controllers. For example, and without limitation, sub-controller 340 may include any controllers and/or components thereof that are similar to distributed flight controller and/or flight controller as described above. Sub-controller 340 may include any component of any flight controller as described above. Sub-controller 340 may be implemented in any manner suitable for implementation of a flight controller as described above. As a further non-limiting example, sub-controller 340 may include one or more processors, logic components and/or computing devices capable of receiving, processing, and/or transmitting data across the distributed flight controller as described above. As a further non-limiting example, sub-controller 340 may include a controller that receives a signal from a first flight controller and/or first distributed flight controller component and transmits the signal to a plurality of additional sub-controllers and/or flight components.

Still referring to FIG. 3, flight controller may include a co-controller 344. As used in this disclosure a "co-controller" is a controller and/or component that joins flight controller 304 as components and/or nodes of a distributed flight controller as described above. For example, and without limitation, co-controller 344 may include one or more controllers and/or components that are similar to flight controller 304. As a further non-limiting example, co-controller 344 may include any controller and/or component that joins flight controller 304 to distributed flight controller. As a further non-limiting example, co-controller 344 may include one or more processors, logic components and/or computing devices capable of receiving, processing, and/or transmitting data to and/or from flight controller 304 to distributed flight control system. Co-controller 344 may include any component of any flight controller as described above. Co-controller 344 may be implemented in any manner suitable for implementation of a flight controller as described above.

In an embodiment, and with continued reference to FIG. 3, flight controller 304 may be designed and/or configured to perform any method, method step, or sequence of method steps in any embodiment described in this disclosure, in any order and with any degree of repetition. For instance, flight controller 304 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Flight controller may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Figure 4:
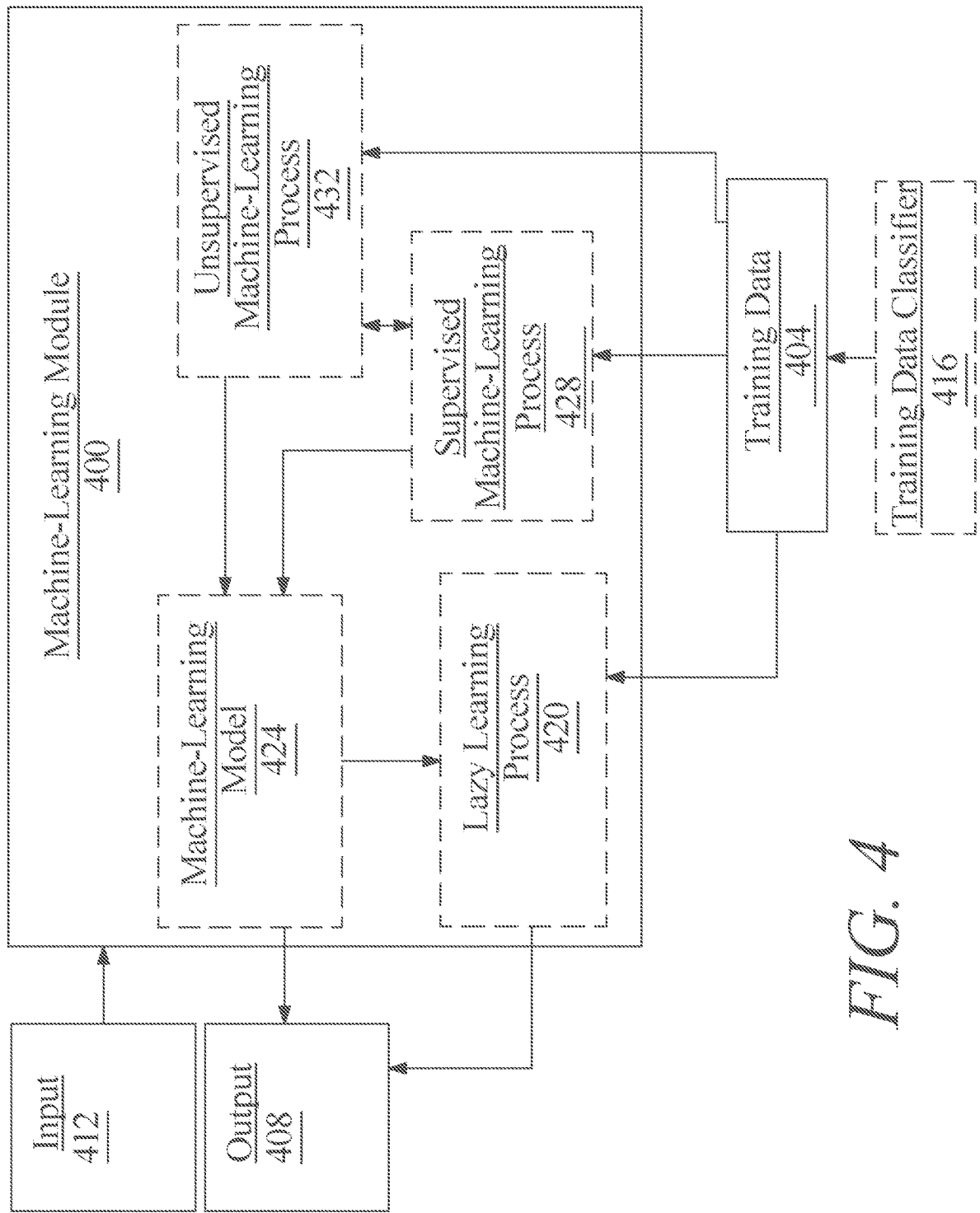
FIG. 4 is a block diagram of an exemplary machine learning module.

Referring now to FIG. 4, an exemplary embodiment of a machine-learning module 400 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 404 to generate an algorithm that will be performed by a computing device/module to produce outputs 408 given data provided as inputs 412; this is in contrast to a non-machine learning software program where the commands to be executed are determined in advance by a user and written in a programming language.

Still referring to FIG. 4, "training data," as used herein, is data containing correlations that a machine-learning process may use to model relationships between two or more categories of data elements. For instance, and without limitation, training data 404 may include a plurality of data entries, each entry representing a set of data elements that were recorded, received, and/or generated together; data elements may be correlated by shared existence in a given data entry, by proximity in a given data entry, or the like. Multiple data entries in training data 404 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 404 according to various correlations; correlations may indicate causative and/or predictive links between categories of data elements, which may be modeled as relationships such as mathematical relationships by machine-learning processes as described in further detail below. Training data 404 may be formatted and/or organized by categories of data elements, for instance by associating data elements with one or more descriptors corresponding to categories of data elements. As a non-limiting example, training data 404 may include data entered in standardized forms by persons or processes, such that entry of a given data element in a given field in a form may be mapped to one or more descriptors of categories. Elements in training data 404 may be linked to descriptors of categories by tags, tokens, or other data elements; for instance, and without limitation, training data 404 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 4, training data 404 may include one or more elements that are not categorized; that is, training data 404 may not be formatted or contain descriptors for some elements of data. Machine-learning algorithms and/or other processes may sort training data 404 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 404 to be made applicable for two or more distinct machine-learning algorithms as described in further detail below. Training data 404 used by machine-learning module 400 may correlate any input data as described in this disclosure to any output data as described in this disclosure. As a non-limiting illustrative example flight elements and/or pilot signals may be inputs, wherein an output may be an autonomous function.

Further referring to FIG. 4, training data may be filtered, sorted, and/or selected using one or more supervised and/or unsupervised machine-learning processes and/or models as described in further detail below; such models may include without limitation a training data classifier 416. Training data classifier 416 may include a "classifier," which as used in this disclosure is a machine-learning model as defined below, such as a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. Machine-learning module 400 may generate a classifier using a classification algorithm, defined as a processes whereby a computing device and/or any module and/or component operating thereon derives a classifier from training data 404. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 416 may classify elements of training data to sub-categories of flight elements such as torques, forces, thrusts, directions, and the like thereof.

Still referring to FIG. 4, machine-learning module 400 may be configured to perform a lazy-learning process 420 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 404. Heuristic may include selecting some number of highest-ranking associations and/or training data 404 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 4, machine-learning processes as described in this disclosure may be used to generate machine-learning models 424. A "machine-learning model," as used in this disclosure, is a mathematical and/or algorithmic representation of a relationship between inputs and outputs, as generated using any machine-learning process including without limitation any process as described above, and stored in memory; an input is submitted to a machine-learning model 424 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 424 may be generated by creating an artificial neural network, such as a convolutional neural network comprising an input layer of nodes, one or more intermediate layers, and an output layer of nodes. Connections between nodes may be created via the process of "training" the network, in which elements from a training data 404 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 4, machine-learning algorithms may include at least a supervised machine-learning process 428. At least a supervised machine-learning process 428, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include flight elements and/or pilot signals as described above as inputs, autonomous functions as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 404. Persons skilled in the art, upon reviewing the entirety of this disclosure, will be aware of various possible variations of at least a supervised machine-learning process 428 that may be used to determine relation between inputs and outputs. Supervised machine-learning processes may include classification algorithms as defined above.

Further referring to FIG. 4, machine learning processes may include at least an unsupervised machine-learning processes 432. An unsupervised machine-learning process, as used herein, is a process that derives inferences in datasets without regard to labels; as a result, an unsupervised machine-learning process may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 4, machine-learning module 400 may be designed and configured to create a machine-learning model 424 using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 4, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Figure 5:
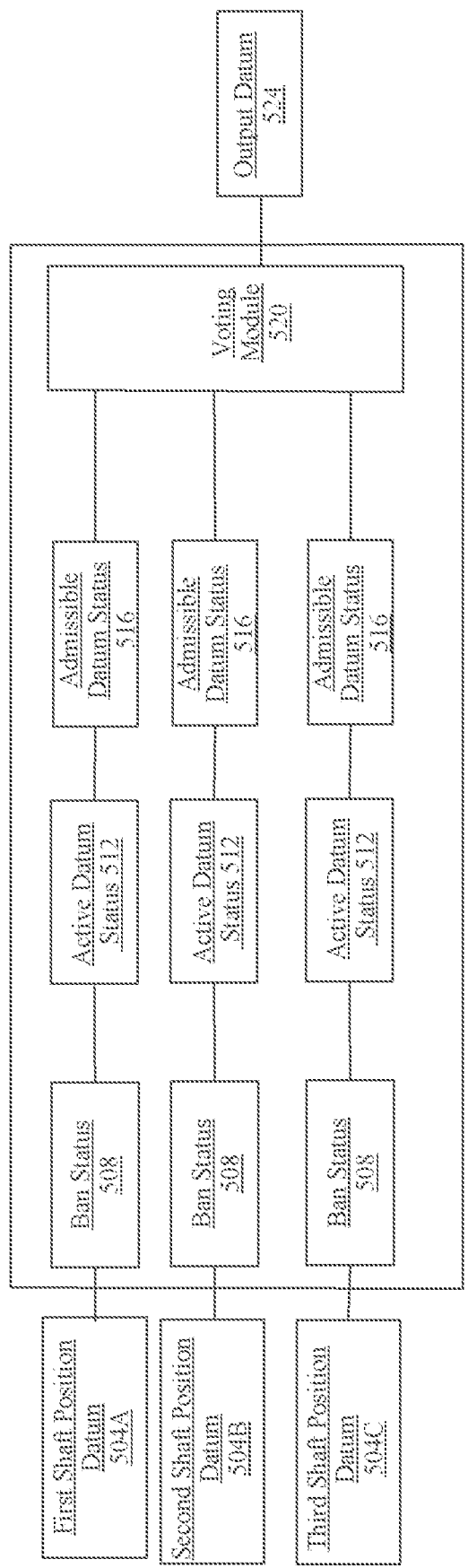
FIG. 5 is a block diagram further describing a voting algorithm.

Moving to FIG. 5, which shows an embodiment of voting algorithm 500, voting algorithm 500 receives a first shaft position datum 504A, a second shaft position datum 504B, and a third shaft position datum 504C. Although FIG. 5 only shows voting algorithm 500 receiving three shaft position datum, voting algorithm 500, in some embodiments, may receive more than three shaft position datum. For example, in some embodiments, voting algorithm 500 may receive as many shaft position datum as there are electromagnetic effect sensors.

Continuing with FIG. 5, each shaft position datum received by the voting algorithm 500, for instance first shaft position datum 504A, second shaft position datum 504B, and third shaft position datum 504C contains a ban status 508, an active datum status 512, and an admissible datum status 516. Each of these can be in the form of a binary "0 or 1" value, an electrical signal, or an element of data. Ban status 508 may be "banned" or "unbanned." If the banned status is "banned," then the respective shaft position datum may not be received by the voting module 520, or is otherwise excluded from the voting process. The voting algorithm 500 also excludes shaft position datum that are not an active datum based on active datum status 512 or not an admissible datum based on admissible datum status 516. For example, and without limitation, there may be more than one allowed sensor with associated shaft position datums. Shaft position datum which have not been excluded because of their ban status 508, active datum status 512, or admissible datum status 516 can be received by the voting module 520.

Continuing with FIG. 5, voting module 520 may combine active and/or admissible data to generate and/or output datum 524; combining may include without limitation any form of mathematical aggregation, such as a sum, a weighted sum, a product, a weighted product, a triangular norm such as a minimum, bounded product, algebraic product, drastic product, or the like, a triangular co-norm such as a maximum, bounded sum, algebraic sum, drastic sum, or the like, an average such as an arithmetic and/or geometric mean, or the like. One of ordinary skill in the art, after reviewing the entirety of this disclosure, would appreciate that averaging (finding the mean) of a plurality of shaft position datum from a plurality of allowed sensors is only one example of mathematical or other operations suitable to take all "votes" into account when generating an output datum 524.

Returning to FIG. 2, voting algorithm includes determining whether a given electromagnetic sensor is an active datum 220. "Active datum 220", for the purposes of this disclosure, refers to a command received within a predetermined and expected time limit. For example, and without limitation, flight controller 204 may calculate when at least a sensor is supposed to transmit a shaft position datum, and if that shaft position datum arrives outside of that time limit or time range, then shaft position datum may be determined to not be an active datum 220. If flight controller 204 receives shaft position datum within that expected time range, shaft position datum may be determined to be an active datum 220. Active datum 220 may be a safeguard against old or stale data, wherein stale data may be outdated in view of more recent data.

Figure 2:
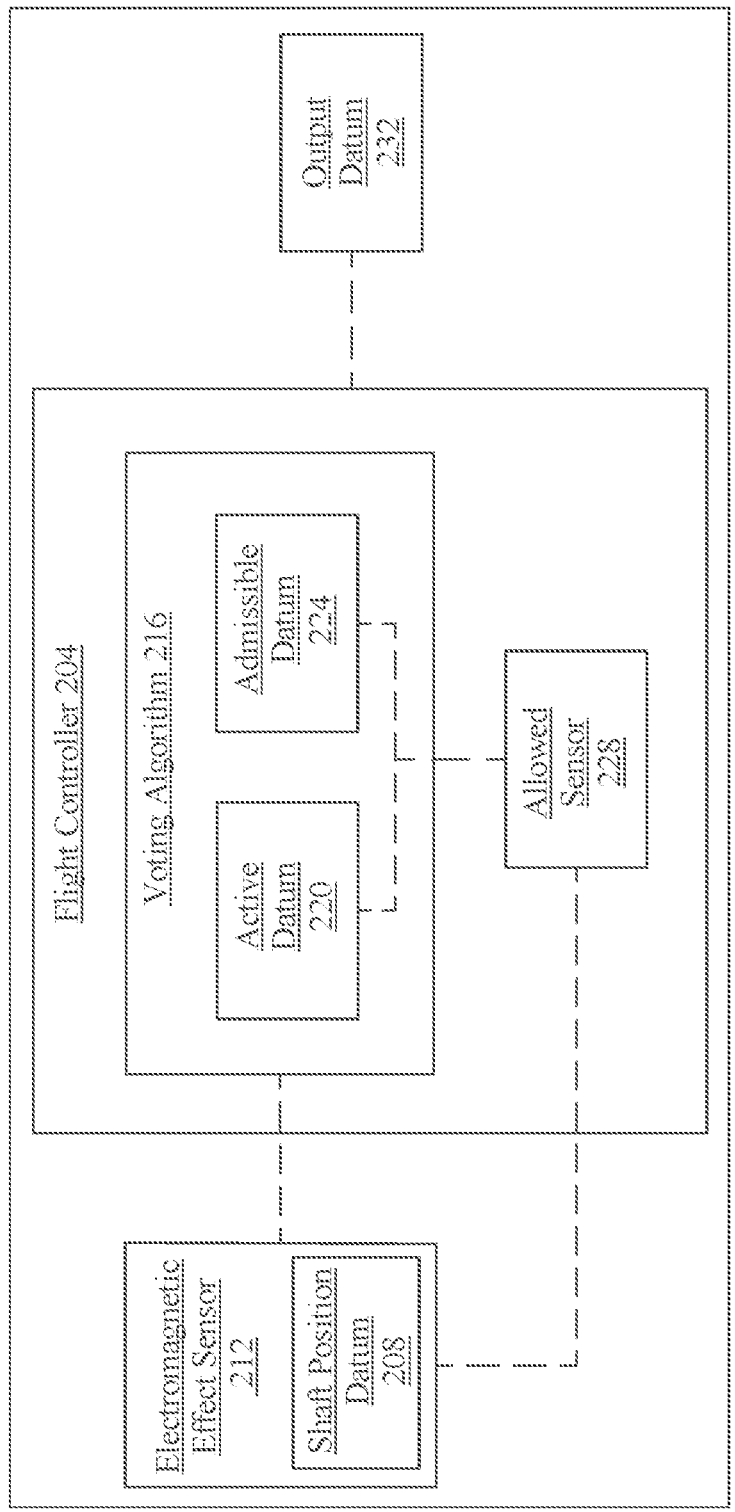
FIG. 2 illustrates an exemplary flight controller's relationship to an electromagnetic effect sensor and a voting algorithm.
Figure 7:
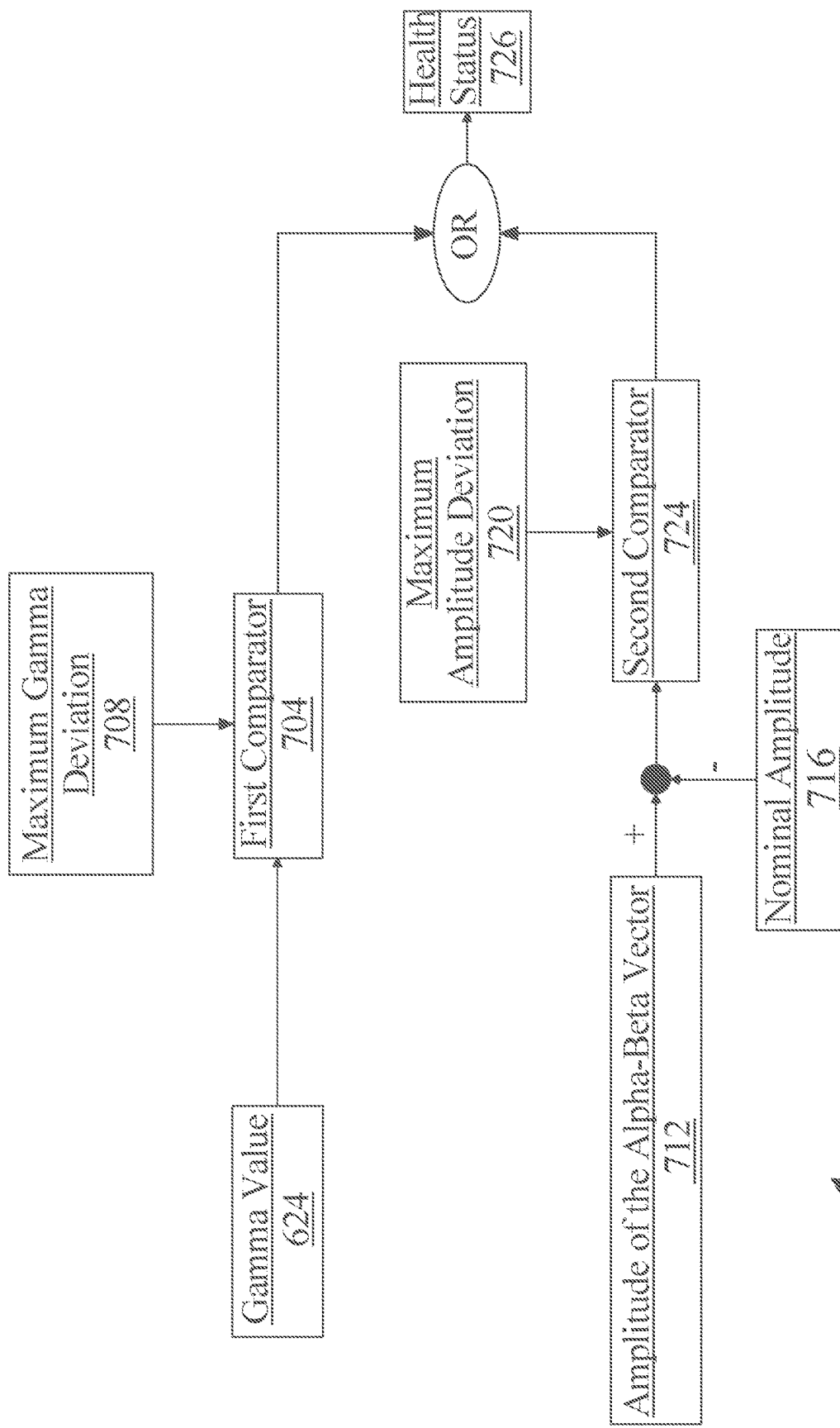
FIG. 7 is a flow diagram of an admissible datum evaluation process.

Still referring to FIG. 2, voting algorithm also includes determining whether a given electromagnetic sensor is an admissible datum 224. Admissible datum 224, for the purposes of this disclosure, refers to datum that have a "healthy" health status, as a result of admissible datum evaluation process 700, an embodiment of which is depicted in FIG. 7. If an electromagnetic effect sensor 212 is an active datum 220 and an admissible datum 224, then it is an allowed sensor 228.

Continuing with FIG. 2, in some embodiments, determining what is an allowed sensor comprises determining whether each shaft position datum 208 is an admissible datum may include performing a Clarke transform. Flight controller 204 can output an output datum 232.

Figure 6:
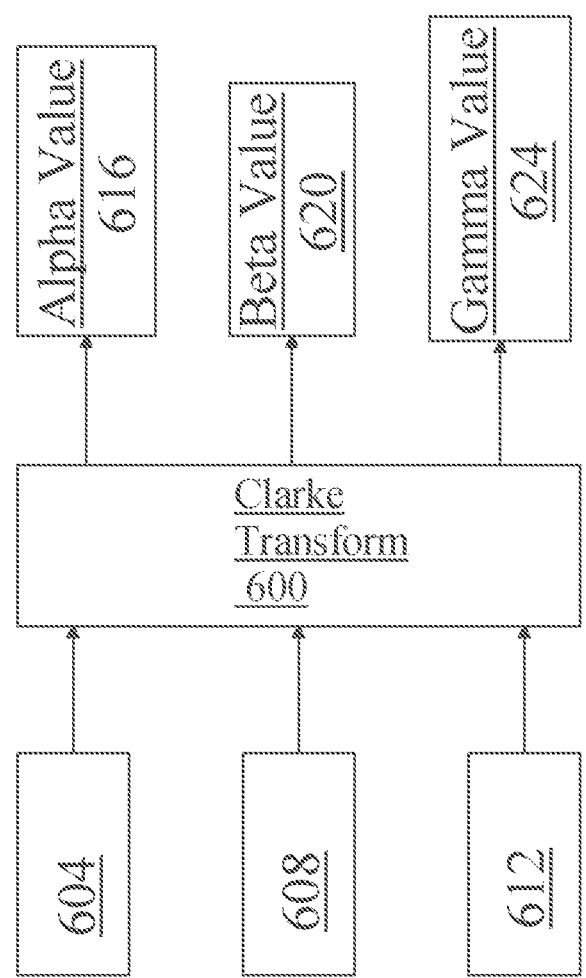
FIG. 6 is a chart showing the inputs and outputs of a Clarke transform.

Referring to FIG. 6, Clarke transform 600 (also called an alpha-beta transform) can take three measured values as input. These three measured values can be a first measured value 604, a second measured value 608, and a third measured value 612. As a non-limiting example, first measured value 604 could be first shaft position datum 504A, second measured value 608 could be second shaft position datum 504B, and third measured value 612 could be third shaft position datum 504C. Clarke transform 600 may output an alpha value 616, a beta value 620, and a gamma value 624. Alpha value 616 and beta value 620 output by Clarke transform 600 are orthogonal to each other. In some embodiments, flight controller 204 may receive alpha value 616, beta value 620, and gamma value 624 resulting from Clarke transform 600.

Moving to FIG. 7, in some embodiments, the output values of Clarke transform 600 (alpha value 616, beta value 620, and gamma value 624) may be used in admissible datum evaluation process 700. In some aspects of the invention, determining whether each shaft position datum is an admissible datum may also include monitoring the gamma value 624. In the event that alpha value 616, beta value 620, and gamma value 624 are properly spaced (120 degrees) apart and are scaled properly, then the gamma value 624 output by Clarke transform 604 should be zero. A non-zero gamma value 624 suggests that there is an issue with either the phase or amplitude of one or more of alpha value 616, beta value 620, and gamma value 624. Additionally, admissible datum evaluation process 700 may also include using a first comparator 704 to compare the gamma value 624 output against a maximum gamma deviation 708.

Still referring to FIG. 7, in other aspects of the invention, admissible datum evaluation process 700 may also involve monitoring an alpha-beta vector. Alpha-beta vector can be formed using alpha value 616 and beta value 620. The amplitude of the alpha-beta vector 712 can be calculated using the formula $\sqrt{\alpha^2+\beta^2}$. In the event that the sensor elements are operating normally, then the amplitude of the alpha-beta vector 712 should remain constant. In some embodiments, there may be a nominal amplitude 716. In some cases, for example, admissible datum evaluation process 700 may subtract nominal amplitude 716 from amplitude of the alpha-beta vector 712. This value can be compared to a maximum amplitude deviation 720 by a second comparator 724. In some cases, this may also include taking the absolute value of deviation value. Second comparator 724 may compare the difference between amplitude of the alpha-beta vector 712 and nominal amplitude 716 and a maximum amplitude deviation 720.

Still referring to FIG. 7, admissible datum evaluation process 700 may include a health status 726. Health status 726 may use a binary value to record the result of the admissible datum evaluation process 700. For instance, in a non-limiting embodiment, the health status may be set to "1" to indicate that electromagnetic effect sensor is "healthy", and it may be set to "0" to indicate that electromagnetic effect sensor is "unhealthy" or vice versa. Health status 726 may also be in the form of an electrical signal or an element of data. In certain embodiments, when either gamma value 624 exceeds maximum gamma deviation 708 or maximum amplitude deviation 720 is exceeded, then, health status 726 may be set to "unhealthy." Otherwise, health status 726, may be set to, or remain, "healthy."

One of ordinary skill in the art would appreciate, after reviewing the entirety of this disclosure, that any number of flight controllers can perform any number of the herein disclosed steps in combination with other computing devices or systems and perform these calculations relating to any number of components, banning and unbanning any component in system.

Figure 8:
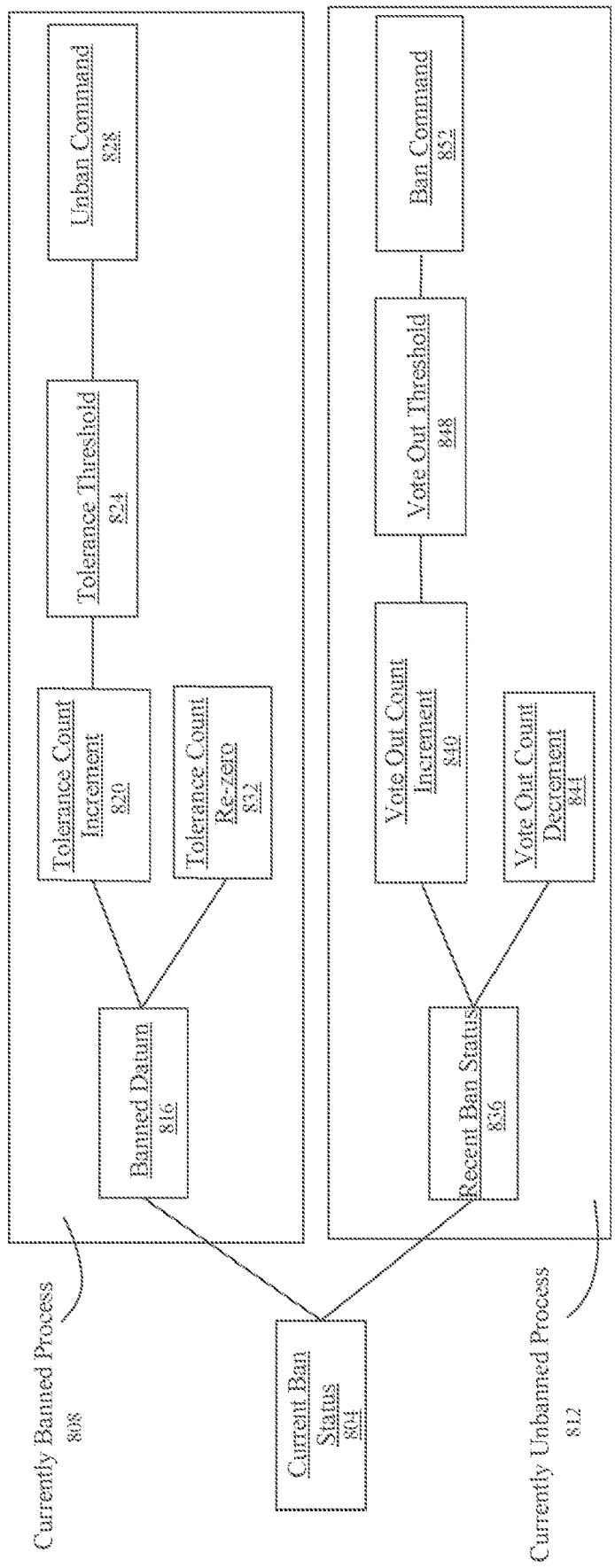
FIG. 8 is a block diagram of a banning algorithm showing both a currently banned process and a currently unbanned process.

Moving to FIG. 8, in certain aspects, voting algorithm may comprise a banning algorithm 800. Banning algorithm 800, for the purposes of this disclosure, may be a process of monitoring electromagnetic effect sensor 212 in order to determine whether electromagnetic effect sensor 212 is banned, needs to be banned, or is unbanned. Each shaft position datum 208, which is associated with an electromagnetic sensor 212, contains a ban status 804. If the ban status 804 is "banned," then shaft position datum 208 from an electromagnetic effect sensor 212 may be governed by a currently banned process 808. If the ban status 804 is "unbanned," then shaft position datum 208 from an electromagnetic effect sensor 212 may be governed by a currently unbanned process 812.

Continuing with FIG. 8, currently banned process 808 may include receiving a banned datum 816. In some cases, banned datum 816 may be both an active datum 220 and an admissible datum 224. In some embodiments, this process may include, in cases where banned datum 816 is determined to be both an active datum 220 and an admissible datum 224, triggering tolerance count increment 820. Tolerance count increment 820 may, for example, increase the tolerance count by a set number. For example, this set number could be one. Tolerance threshold 824 may be set to a number. For example, this number could be 5, 10, 50, or more. Tolerance threshold 824 may be any positive number. In some embodiments, tolerance threshold 824 may be set to different numbers for different electromagnetic effect sensors 212. For example, in a nonlimiting embodiment, tolerance threshold 824 may be higher for electromagnetic effect sensors 212 that have frequently had a "banned" ban status 804. Once tolerance count increment 820 equals tolerance threshold 824, then unban command 828 may be triggered. In another embodiment, unban command 828 may be triggered once tolerance count exceeds tolerance threshold 824. Unban command 828, when triggered, may change ban status 804 for an electromagnetic effect sensor 212 to "unbanned." Conversely, in certain embodiments, when banned datum 816 is determined to be either not an active datum 220 or not an admissible datum 224, tolerance count re-zero 832 may be triggered. Tolerance count re-zero 832 may set the tolerance count to zero.

Continuing with FIG. 8, if the ban status 804 is "unbanned," then the electromagnetic effect sensor 212 may be subject to currently unbanned process 812. Recent ban status 836 tracks whether electromagnetic effect sensor 212 has previously been "voted out" i.e., "banned." If the shaft position datum 208 is determined to be either not an active datum 220, or not an admissible datum 224, them a vote out count increment 840 may be initiated. This process may increase a vote out count by a set number, such as one. If the shaft position datum 208 is associated with an electromagnetic effect sensor 212 that has not recently triggered vote out count increment 840, then, vote out count decrement 844 may be initiated. This process may decrease the vote out count by a set number, such as one. If vote out count equals vote out threshold 848, then ban command 852 may be initiated. For instance, this may encompass electromagnetic effect sensor 212 associated with shaft position datum 208 having its ban status 804 set to "banned."

Figure 9:
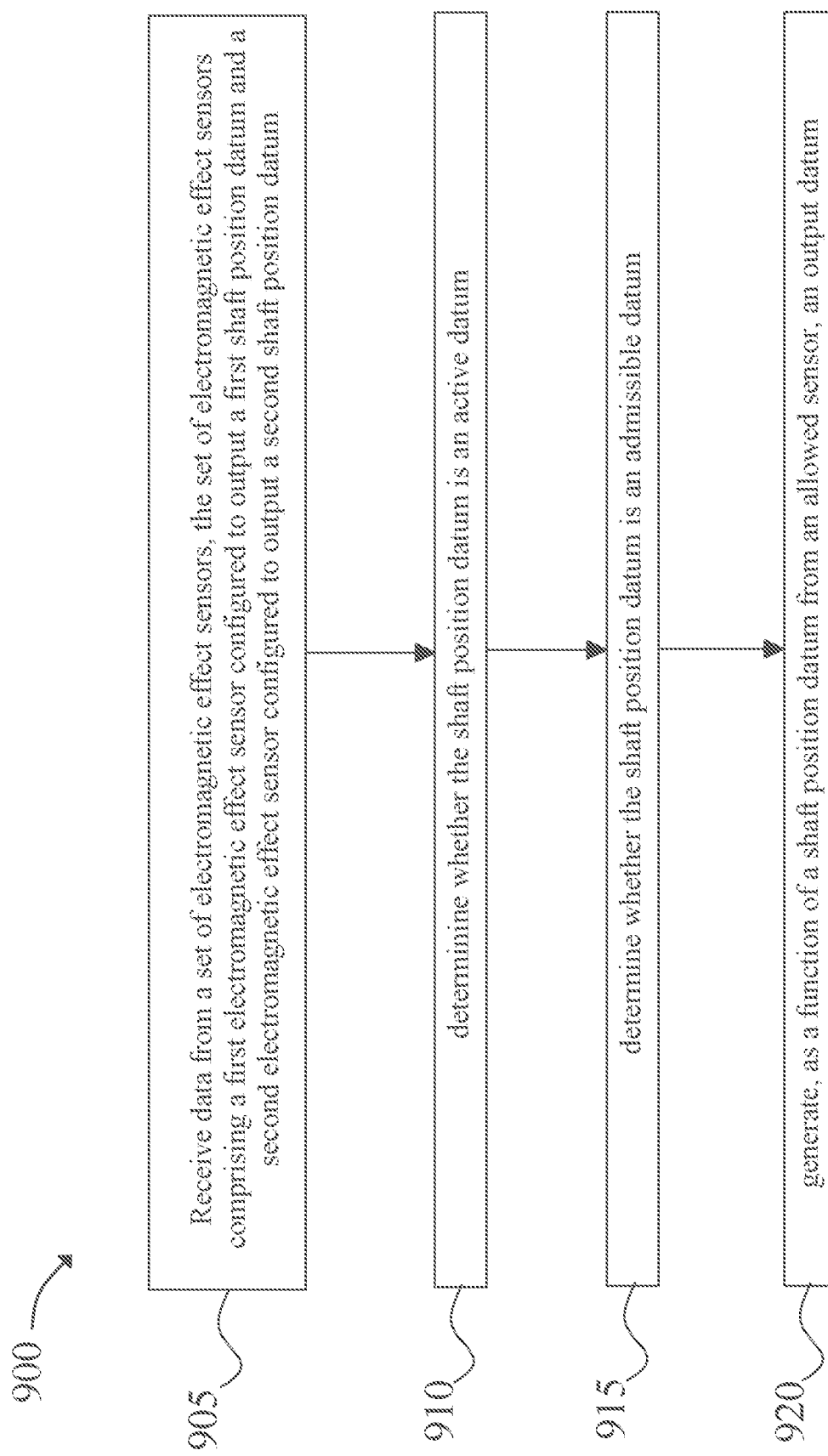
FIG. 9 is a flow chart depicting a method of determining angular position.

FIG. 9 shows an embodiment for a method for estimating angular position 900. At step 905, method 900 includes receiving data from a set of electromagnetic effect sensors, the set of electromagnetic effect sensors comprising a first electromagnetic effect sensor configured to output a first shaft position datum and a second electromagnetic effect sensor configured to output a second shaft position datum. The set of electromagnetic effect sensors may include any sensor suitable for use as first sensor, including without limitation any sensor that makes its readings based on an electromagnetic effect.

Still referring to FIG. 9, step 910 includes determining whether the shaft position datum is an active datum. For the purposes of this disclosure, active datum refers to a command received within a predetermined and expected time limit. For example, and without limitation, flight controller may calculate when at least a sensor is supposed to transmit a shaft position datum, and if that shaft position datum arrives outside of that time limit or time range, then shaft position datum may be determined to not be an active datum.

Still referring to FIG. 9, step 915, comprises determining whether the shaft position datum is an admissible datum. Admissible datum, for the purposes of this disclosure, refers to datum that have a "healthy" health status, as a result of admissible datum evaluation process 700, an embodiment of which is depicted in FIG. 7

Still referring to FIG. 9, step 925 includes generating, as a function of a shaft position datum from an allowed sensor, an output datum. Method for estimating angular position 900 may be implemented, without limitation, as described above.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random-access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 10:
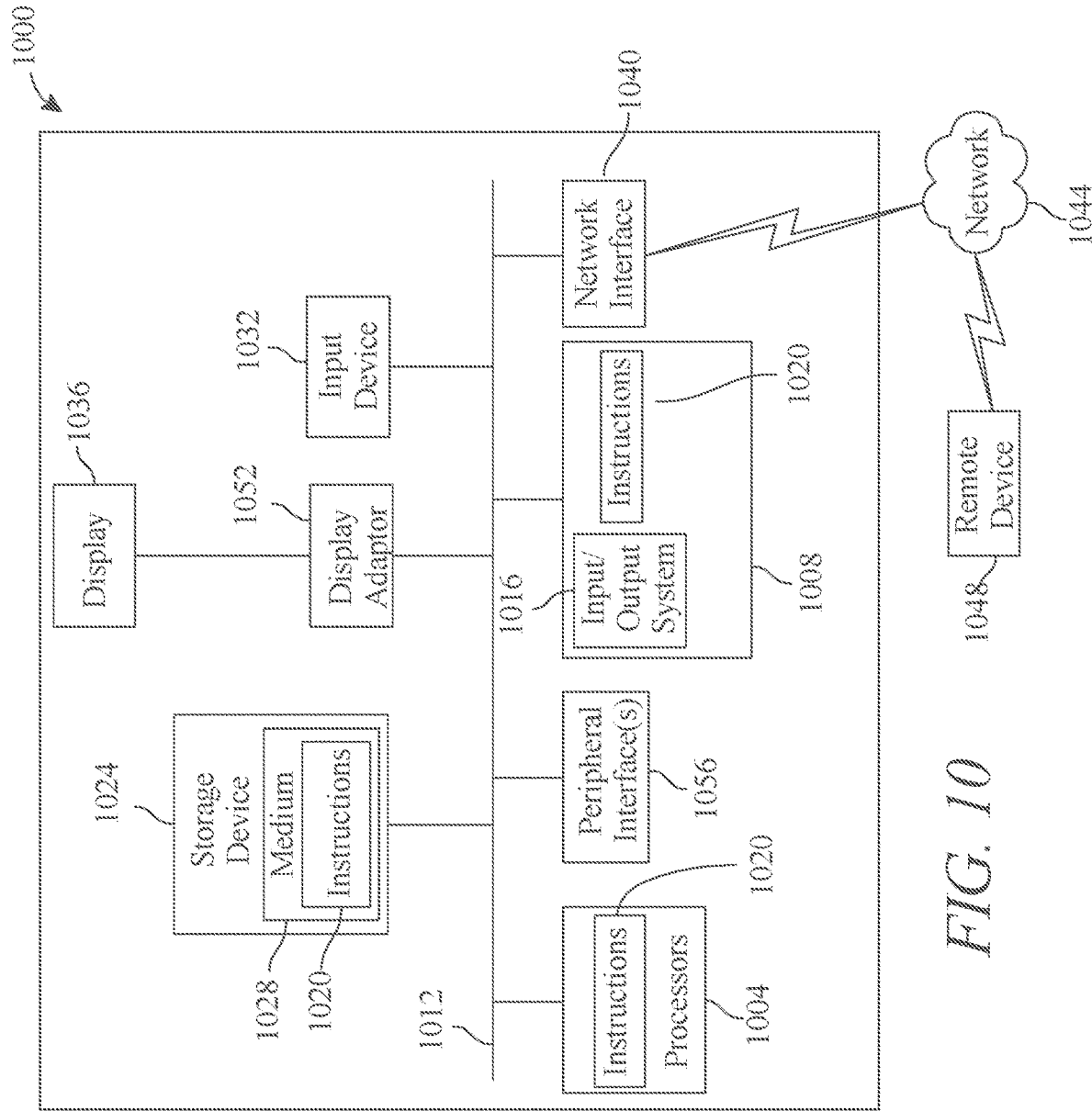
FIG. 10 is a block diagram of a computing system that can be used to implement any one or more of the methodologies disclosed herein and any one or more portions thereof.

FIG. 10 shows a diagrammatic representation of one embodiment of a computing device in the exemplary form of a computer system 1000 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 1000 includes a processor 1004 and a memory 1008 that communicate with each other, and with other components, via a bus 1012. Bus 1012 may include any of several types of bus structures including, but not limited to, a memory bus, a memory controller, a peripheral bus, a local bus, and any combinations thereof, using any of a variety of bus architectures.

Processor 1004 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 1004 may be organized according to Von Neumann and/or Harvard architecture as a non-limiting example. Processor 1004 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating-point unit (FPU), and/or system on a chip (SoC).

Memory 1008 may include various components (e.g., machine-readable media) including, but not limited to, a random-access memory component, a read only component, and any combinations thereof. In one example, a basic input/output system 1016 (BIOS), including basic routines that help to transfer information between elements within computer system 1000, such as during start-up, may be stored in memory 1008. Memory 1008 may also include (e.g., stored on one or more machine-readable media) instructions (e.g., software) 1020 embodying any one or more of the aspects and/or methodologies of the present disclosure. In another example, memory 1008 may further include any number of program modules including, but not limited to, an operating system, one or more application programs, other program modules, program data, and any combinations thereof.

Computer system 1000 may also include a storage device 1024. Examples of a storage device (e.g., storage device 1024) include, but are not limited to, a hard disk drive, a magnetic disk drive, an optical disc drive in combination with an optical medium, a solid-state memory device, and any combinations thereof. Storage device 1024 may be connected to bus 1012 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 1024 (or one or more components thereof) may be removably interfaced with computer system 1000 (e.g., via an external port connector (not shown)). Particularly, storage device 1024 and an associated machine-readable medium 1028 may provide nonvolatile and/or volatile storage of machine-readable instructions, data structures, program modules, and/or other data for computer system 1000. In one example, software 1020 may reside, completely or partially, within machine-readable medium 1028. In another example, software 1020 may reside, completely or partially, within processor 1004.

Computer system 1000 may also include an input device 1032. In one example, a user of computer system 1000 may enter commands and/or other information into computer system 1000 via input device 1032. Examples of an input device 1032 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 1032 may be interfaced to bus 1012 via any of a variety of interfaces (not shown) including, but not limited to, a serial interface, a parallel interface, a game port, a USB interface, a FIREWIRE interface, a direct interface to bus 1012, and any combinations thereof. Input device 1032 may include a touch screen interface that may be a part of or separate from display 1036, discussed further below. Input device 1032 may be utilized as a user selection device for selecting one or more graphical representations in a graphical interface as described above.

A user may also input commands and/or other information to computer system 1000 via storage device 1024 (e.g., a removable disk drive, a flash drive, etc.) and/or network interface device 1040. A network interface device, such as network interface device 1040, may be utilized for connecting computer system 1000 to one or more of a variety of networks, such as network 1044, and one or more remote devices 1048 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 1044, may employ a wired and/or a wireless mode of communication. In general, any network topology may be used. Information (e.g., data, software 1020, etc.) may be communicated to and/or from computer system 1000 via network interface device 1040.

Computer system 1000 may further include a video display adapter 1052 for communicating a displayable image to a display device, such as display device 1036. Examples of a display device include, but are not limited to, a liquid crystal display (LCD), a cathode ray tube (CRT), a plasma display, a light emitting diode (LED) display, and any combinations thereof. Display adapter 1052 and display device 1036 may be utilized in combination with processor 1004 to provide graphical representations of aspects of the present disclosure. In addition to a display device, computer system 1000 may include one or more other peripheral output devices including, but not limited to, an audio speaker, a printer, and any combinations thereof. Such peripheral output devices may be connected to bus 1012 via a peripheral interface 1056. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions and additions may be made to that which is specifically disclosed herein without departing from the spirit and scope of the present invention.

What is claimed is:

1. A system for estimating angular position, the system comprising: a set of electromagnetic effect sensors comprising: a first electromagnetic effect sensor, the first electromagnetic effect sensor configured to output a first shaft position datum; and a second electromagnetic effect sensor, the second electromagnetic effect sensor configured to output a second shaft position datum; a flight controller, the flight controller communicatively connected to the set of electromagnetic effect sensors, the flight controller configured to perform a voting algorithm, the voting algorithm comprising: determining that at least one of the set of electromagnetic effect sensors is an allowed sensor, wherein determining that at least one of the set of electromagnetic effect sensors is the allowed sensor comprises determining, for each shaft position datum of the first shaft position datum and the second shaft position datum: whether the shaft position datum is an active datum; and whether the shaft position datum is an admissible datum, generating, as a function of the shaft position datum from the allowed sensor, an output datum, wherein the flight controller is configured to: determine that an electromagnetic effect sensor of the set of electromagnetic effect sensors has transmitted a shaft position datum that is not an admissible datum; and ban that electromagnetic sensor, and wherein the voting algorithm further comprises: receiving an unbanned datum; if the unbanned datum is not an active datum or not an admissible datum, then increasing a vote out count; if the unbanned datum is both an active datum and an admissible datum, then decreasing the vote out count.

2. The system of claim 1, wherein each electromagnetic effect sensor of the set of electromagnetic effect sensors comprises at least three sensor elements, the at least three sensor elements generating three measured values.

3. The system of claim 2, wherein determining whether each shaft position datum is the admissible datum further comprises: performing a Clarke transform of the three measured values; and receiving, from the Clarke transform, output values, wherein the output values include an alpha value, a beta value, and a gamma value.

4. The system of claim 1, wherein determining whether the shaft position datum is the admissible datum further comprises:
monitoring the gamma value; and
comparing the gamma value output against a maximum allowable gamma deviation.

5. The system of claim 4, wherein determining whether the shaft position datum is the admissible datum further comprises:
monitoring an alpha-beta vector;
subtracting a nominal value for the alpha-beta vector from the alpha-beta vector in order to generate a deviation value;
calculating an absolute value of the deviation value; and
comparing the absolute value of the deviation value to a maximum amplitude deviation.

6. The system of claim 1, wherein the flight controller is configured to:
determine that an electromagnetic effect sensor of the set of electromagnetic effect sensors has transmitted a shaft position datum that is not an active datum; and
ban that electromagnetic effect sensor.

7. The system of claim 6, wherein the flight controller is configured to:
determine that an electromagnetic effect sensor of the set of electromagnetic effect sensors has transmitted a shaft position datum that is not an admissible datum; and
ban that electromagnetic effect sensor.

8. The system of claim 1, wherein the voting algorithm further comprises:
monitoring an electromagnetic effect sensor that has been banned, comprising:
receiving a banned datum;
determining whether the banned datum is both an active datum and an admissible datum;
if the banned datum is both an active datum and an admissible datum, then incrementing a tolerance count;
once the tolerance count reaches a tolerance threshold, unbanning the electromagnetic effect sensor; and
if the tolerance datum is determined to be either not an active datum or not an admissible datum, then setting the tolerance count to zero.

9. A method for estimating angular position, the method comprising: receiving data from a set of electromagnetic effect sensors, the set of electromagnetic effect sensors comprising a first electromagnetic effect sensor configured to output a first shaft position datum and a second electromagnetic effect sensor configured to output a second shaft position datum; determining that at least one of a set of electromagnetic effect sensors is an allowed sensor, wherein determining that at least one of the set of electromagnetic effect sensors is the allowed sensor comprises, for each shaft position datum of the first shaft position datum and the second shaft position datum: determining whether the shaft position datum is an active datum; and determining whether the shaft position datum is admissible datum, generating, as a function of the shaft position datum from the allowed sensor, an output datum, determining that an electromagnetic effect sensor of the set of electromagnetic effect sensors has transmitted a shaft position datum that is not an admissible datum; and banning that electromagnetic effect sensor, and receiving an unbanned datum; increasing a vote out count if the unbanned datum is not an active datum or not an admissible datum; and decreasing the vote out count if the unbanned datum is both an active datum and an admissible datum.

10. The method of claim 9, wherein receiving data from the set of electromagnetic effect sensors further comprises receiving three measured values from each electromagnetic effect sensor of the set of electromagnetic effect sensors, each electromagnetic effect sensor of the set of electromagnetic effect sensors comprising at least three sensor elements, the at least three sensor elements generating the three measured values.

11. The method of claim 10, wherein determining whether the shaft position datum is the admissible datum further comprises: performing a Clarke transform of the three measured values; and receiving, from the Clarke transform, output values, wherein the output values include an alpha value, a beta value, and a gamma value.

12. The method of claim 11, wherein determining whether the shaft position datum is the admissible datum further comprises:
   monitoring the gamma value; and
   comparing the gamma value output against a maximum allowable gamma deviation.

13. The method of claim 12, wherein determining whether the shaft position datum is the admissible datum further comprises:
   monitoring an alpha-beta vector;
   subtracting a nominal value for the alpha-beta vector from the alpha-beta vector in order to generate a deviation value;
   calculating an absolute value of the deviation value; and
   comparing the absolute value of the deviation value to a maximum amplitude deviation.

14. The method for estimating angular position of claim 9, further comprising:
   determining that an electromagnetic effect sensor of the set of electromagnetic effect sensors has transmitted a shaft position datum that is not an active datum; and
   banning that electromagnetic effect sensor.

15. The method for estimating angular position of claim 14, further comprising:
   determining that an electromagnetic effect sensor of the set of electromagnetic effect sensors has transmitted a shaft position datum that is not an admissible datum; and
   banning that electromagnetic effect sensor.

16. The method for estimating angular position of claim 9, further comprising:
   monitoring an electromagnetic effect sensor that has been banned, comprising:
      receiving a banned datum;
      determining whether the banned datum is both an active datum and an admissible datum;
      incrementing a tolerance count if the banned datum is both an active datum and an admissible datum;
      unbanning the electromagnetic effect sensor once the tolerance count reaches a tolerance threshold; and
      setting the tolerance count to zero if the tolerance datum is determined to be either not an active datum or not an admissible datum.

* * * * *